(12) United States Patent
Machado et al.

(10) Patent No.: US 9,390,367 B2
(45) Date of Patent: Jul. 12, 2016

(54) RFID TAG AND RFID TAG ANTENNA

(71) Applicant: Wernher von Braun Centro de Pesquisas Avancadas, Campinas (BR)

(72) Inventors: Osmar Vieira Machado, Campinas (BR); Ademir L. Xavier, Campinas (BR); Alexander Sieh, Campinas (BR); Daniel Vidal, Campinas (BR); Henrique Uemura Okada, Marilia (BR); Walter Luis Tercariol, Campinas (BR)

(73) Assignee: Wernher Von Braun Centro De Pesquisas Avancadas, Campinas, Sao Paulo (BR)

( * ) Notice: Subject to any disclaimer, the term of this patent is extended or adjusted under 35 U.S.C. 154(b) by 198 days.

(21) Appl. No.: 14/325,444

(22) Filed: Jul. 8, 2014

(65) Prior Publication Data

US 2016/0012329 A1   Jan. 14, 2016

(51) Int. Cl.
| | |
|---|---|
| *G06K 19/06* | (2006.01) |
| *G08B 13/14* | (2006.01) |
| *H01Q 9/16* | (2006.01) |
| *H01Q 21/00* | (2006.01) |

(Continued)

(52) U.S. Cl.
CPC ........ *G06K 19/07786* (2013.01); *H01Q 1/2225* (2013.01); *H01Q 9/065* (2013.01); *H01Q 21/0075* (2013.01)

(58) Field of Classification Search
CPC ............ G06K 19/07749; G06K 19/0775; G06K 19/07773; G06K 19/07786; H01Q 1/2225; H01Q 9/065; H01Q 21/0075

USPC ............. 235/492; 340/572.1, 572.7; 343/793, 343/816
See application file for complete search history.

(56) References Cited

U.S. PATENT DOCUMENTS

| 3,209,358 A | 9/1965 | Felsenheld |
|---|---|---|
| 6,028,564 A | 2/2000 | Duan et al. |

(Continued)

FOREIGN PATENT DOCUMENTS

| CN | 203192933 | 9/2013 |
|---|---|---|
| DE | 3502706 | 7/1986 |
| WO | 2013081261 | 6/2013 |

OTHER PUBLICATIONS

Hsieh, J., et al., "An RFID Antenna Design for Multi-Layered Printed Circuit Board Applications", In proceeding of: Antennas and Propagation Society International Symposium, Jun. 2007, Honolulu, Hawaii, pp. 309-312, IEEE, US.

(Continued)

*Primary Examiner* — Laura Gudorf

(57) ABSTRACT

A RFID tag (500) includes an antenna (100) that includes a first dipole (110), a first feeder portion (130), a second dipole (120) and a second feeder portion (140). The first feeder portion is coupled to the first dipole at two locations a feeder length distance apart. The second feeder portion is coupled to the second dipole at two locations the feeder length distance apart. The feeder portions are also coupled to an antenna terminal (150). Impedance at the antenna terminal is determined, at least in part, by the feeder length distance. Each of two end portions of the first dipole distal from the first feeder portion is connected to a respective corresponding end portion of the second dipole distal from the second feeder portion, the first and second dipoles thereby forming a rectangle. The antenna is symmetrical about both a major and a minor axis of the rectangle.

20 Claims, 12 Drawing Sheets

(51) Int. Cl.
  *G06K 19/077* (2006.01)
  *H01Q 1/22* (2006.01)
  *H01Q 9/06* (2006.01)

(56) References Cited

U.S. PATENT DOCUMENTS

| | | | |
|---|---|---|---|
| 6,677,916 | B2 | 1/2004 | Skalina et al. |
| D493,446 | S | 7/2004 | Hung et al. |
| D535,647 | S | 1/2007 | Hall et al. |
| 7,215,295 | B2 | 5/2007 | Egbert |
| 7,277,017 | B2 | 10/2007 | Baba et al. |
| 7,292,200 | B2 | 11/2007 | Posluszny et al. |
| 7,501,947 | B2 | 3/2009 | Youn |
| 7,545,328 | B2 | 6/2009 | Son et al. |
| 7,548,167 | B2 | 6/2009 | Yamagajo et al. |
| 7,570,225 | B2 | 8/2009 | Kai et al. |
| 7,580,000 | B2 | 8/2009 | Kai et al. |
| 7,592,961 | B2 | 9/2009 | Thober et al. |
| 7,598,873 | B2 | 10/2009 | Yamagajo et al. |
| D605,641 | S | 12/2009 | Oliver |
| D606,057 | S | 12/2009 | Oliver |
| 7,659,863 | B2 | 2/2010 | Kai et al. |
| D613,276 | S | 4/2010 | Oliver |
| 7,714,794 | B2 | 5/2010 | Hozouri |
| D617,320 | S | 6/2010 | Oliver |
| 7,750,862 | B2 | 7/2010 | Hilgers |
| 7,750,864 | B2 | 7/2010 | Hilgers |
| 7,828,221 | B2 | 11/2010 | Kwon |
| 7,911,404 | B2 | 3/2011 | Yamagajo et al. |
| 7,928,921 | B2 | 4/2011 | Kai et al. |
| 8,089,416 | B2 | 1/2012 | Chung et al. |
| 8,134,505 | B2 | 3/2012 | Yamagajo et al. |
| 8,179,260 | B2 | 5/2012 | Pillai |
| 8,279,125 | B2 | 10/2012 | Bellows |
| 8,319,610 | B2 | 11/2012 | Chang et al. |
| 8,319,694 | B2 | 11/2012 | Yang et al. |
| 8,339,318 | B2 | 12/2012 | Manzi et al. |
| 8,358,246 | B2 | 1/2013 | Tsirline et al. |
| 8,358,251 | B2 | 1/2013 | Fischer |
| D684,564 | S | 6/2013 | Forster |
| 8,570,173 | B2 | 10/2013 | Kai et al. |
| D694,737 | S | 12/2013 | Bufe |
| 8,646,695 | B2 | 2/2014 | Worrall et al. |
| 8,717,244 | B2 | 5/2014 | Joyce, Jr. et al. |
| 2005/0001785 | A1* | 1/2005 | Ferguson ......... G06K 19/07745 343/895 |
| 2005/0040994 | A1 | 2/2005 | Mazoki et al. |
| 2007/0279231 | A1 | 12/2007 | Cheng et al. |
| 2008/0068175 | A1 | 3/2008 | Hockey et al. |
| 2009/0033580 | A1 | 2/2009 | Hozouri |
| 2009/0096696 | A1 | 4/2009 | Joyce, Jr. et al. |
| 2010/0123553 | A1 | 5/2010 | Banerjee et al. |
| 2010/0156736 | A1* | 6/2010 | Chung ............... H01Q 9/28 343/793 |
| 2010/0265041 | A1 | 10/2010 | Almog et al. |
| 2011/0115685 | A1 | 5/2011 | Chang |
| 2012/0056002 | A1* | 3/2012 | Ritamaki ......... G06K 19/07786 235/492 |

OTHER PUBLICATIONS

NXP Semiconductors, "An 1629 UHF RFID Label Antenna Design", May 9, 2008, pp. 1-56, NXP, B.V., Eindhoven, Netherlands.

Abo-Elnaga, T., et al., "Analysis and Design of Universal Compact Flexible UHF RFID Tag Antenna", Progress in Electromagnetics Research B, Oct. 2011, pp. 213-239, vol. 35, EMW Publishing, Boston, US.

Dendup, T., et al., "Analysis of Low Profile UHF RFID Tag Antennas and Performance Evaluation in Presence of a Metallic Surface", The Mediterranean Journal of Computers and Networks, Apr. 26, 2013, pp. 1-9, vol. 9.

Rao, S., et al., "Antenna Design for UHF RFID Tags: A Review and a Practical Application," IEEE Transactions on Antennas and Propagation, Dec. 2005, pp. 3870-3876, vol. 53, No. 12, IEEE, US.

Loo, C., et al., "Chip Impedance Matching for UHF RFID Tag Antenna Design", Progress in Electromagnetics Research, PIER 81, pp. 359-370, 2008, EMW Publishing, Boston, US.

Kang, J., et al., "Compact Mobile RFID Antenna Design and Analysis Using Photonic-assisted Vector Near-field Characterization," IEEE International Conference on RFID, Apr. 16-17, 2008, Las Vegas, Nevada, pp. 81-87, IEEE, US.

Avery Dennison, "Data Sheet for Avery Dennison Model AD-110m5 UHF RFID Inlay", one page, Avery Dennison Corporation, Miamisburg, OH, US, 2014.

Nikkari, M., et al., "Design and Comparison Between Two General Purpose Dipole Type UHF RFID Tag Antennas", 2008, four pages, IEEE, US.

Yang, L., et al., "Design and Development of Novel Inductively Coupled RFID Antennas", In proceeding of: Antennas and Propagation Society International Symposium, Nov. 2006, pp. 1035-1038, IEEE, US.

Yang, L., et al., "Design and Development of Novel Radio Frequency Identification (RFID) Tag Structures", Dec. 2009, Georgia Institute of Technology, US.

Basat, S., et al., "Design of a Novel High-efficiency UHF RFID Antenna on Flexible LCP Substrate with High Read-Range Capability", In proceeding of: Antennas and Propagation Society International Symposium, Nov. 2006, pp. 1031-1034, IEEE, US.

Zhang, M., et al., "Design of Antennas for RFID Application", Development and Implementation of RFID Technology, Feb. 2009, pp. 13-46, InTech, Rijeka, Croatia.

Dakić, B., et al., "Design of RFID Antenna in Ink-Jet Printing Technology", IEEE 10th Jubilee International Symposium on Intelligent Systems and Informatics, Subotica, Serbia, Sep. 2012, pp. 429-432, IEEE, US.

Rao, K., et al., "Impedance Matching Concepts in RFID Transponder Design", In proceeding of: Automatic Identification Advanced Technologies, pp. 39-42, Oct. 2005.

Loo, C., et al., "Impedance Matching for RFID Tag Antennas", 24th Annual Review of Progress in Applied Computational Electromagnetics, Mar. 30-Apr. 4, 2008, pp. 749-753, Niagara Falls, Canada.

Gandhimohan, J., et al., "Indirect Coupling Method of Chip Impedance Matched Dipole Antenna for UHF RFID Tag", International Journal of Computer Applications, Feb. 2012, pp. 36-39, vol. 39, No. 14, Foundation of Computer Science, New York, US.

Chen, S., et al., "Performance of a Folded Dipole with a Closed Loop for RFID Applications", Progress in Electromagnetics Research Symposium, Aug. 27-30, 2007, pp. 329-331, Prague, Czech Republic.

Kumar, A., et al., "Planar Antennas for Passive UHF RFID Tag", Progress in Electromagnetics Research B, vol. 19, 2010, pp. 305-327.

Nikitin, P., et al., "Power Reflection Coefficient Analysis for Complex Impedances in RFID Tag Design", IEEE Transactions on Microwave Theory and Techniques, Sep. 2005, pp. 2721-2724, vol. 53, No. 9. Digital Object Identifier 10.1109/TMTT.2005.854191, IEEE, US.

Tuan, S., et al., "Research for RFID Tag Implementation in Vehicle Environments", Progress in Electromagnetics Research Symposium Proceedings, Mar. 27-30, 2012, five pages.

Loo, C., et al., "RFID Tag Antenna Matching to Frequency Dependent MicroChip Impedance", Antennas and Propagation Society International Symposium, Jul. 2008, four pages.

Marrocco, G., "The Art of UHF RFID Antenna Design: Impedance-Matching and Size-Reduction Techniques", IEEE Antennas and Propagation Magazine, Feb. 2008, pp. 66-79, vol. 50, No. 1, IEEE, US.

Wongsiritorn, P., et al., "UHF-RFID Tag Antenna with Rectangular Loops", Oct. 28, 2011, four pages, International Symposium on Antennas and Propagation, Japan.

International Search Report and Written Opinion dated Jan. 21, 2016, received for International Application No. PCT/IB2015/001569.

* cited by examiner

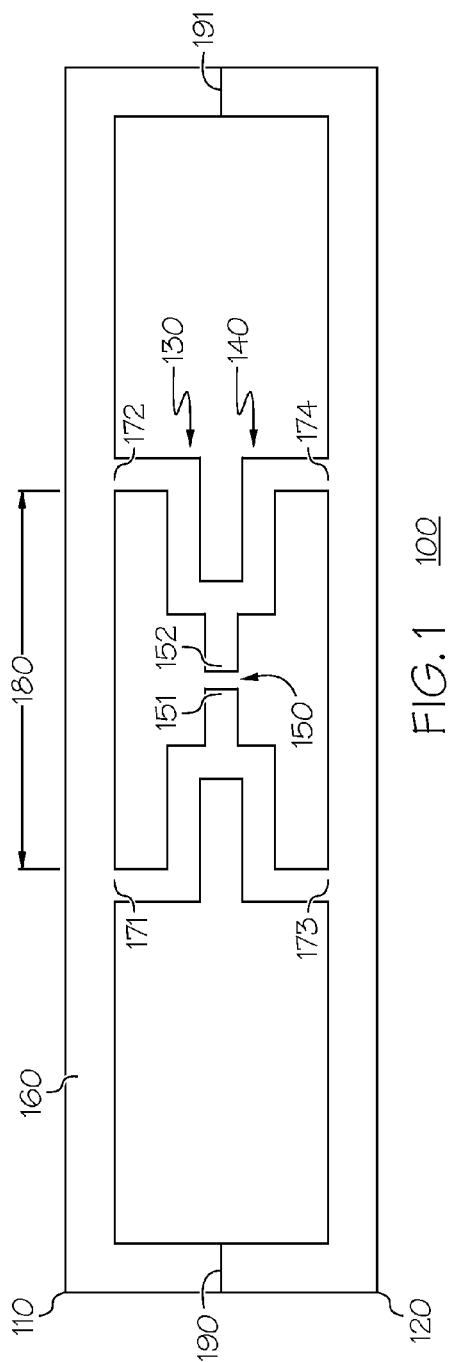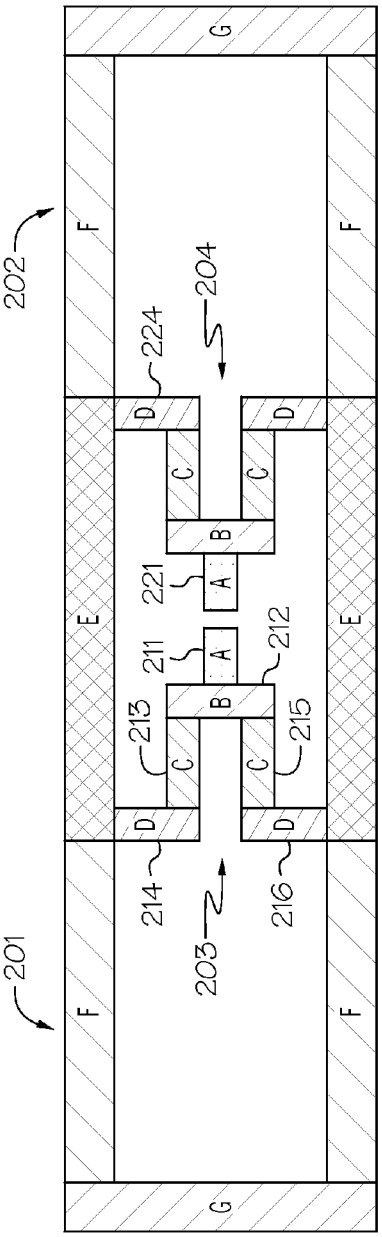

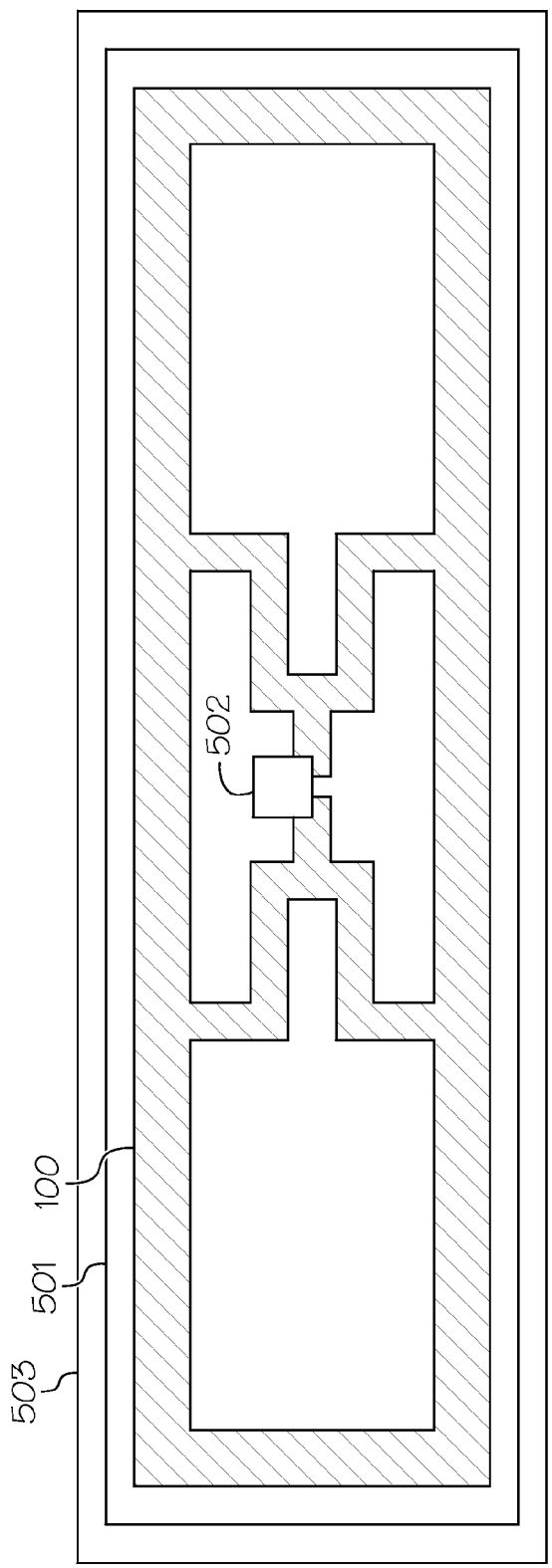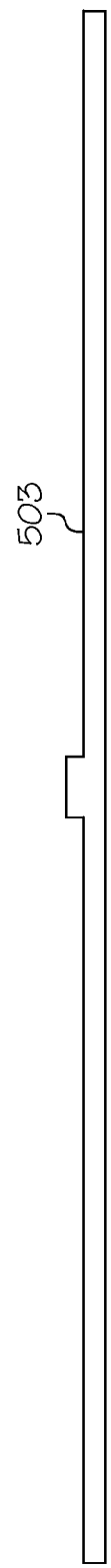
FIG. 5
FIG. 6

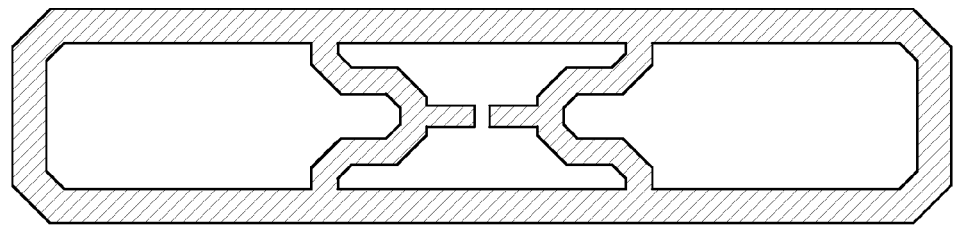
FIG. 16    1600
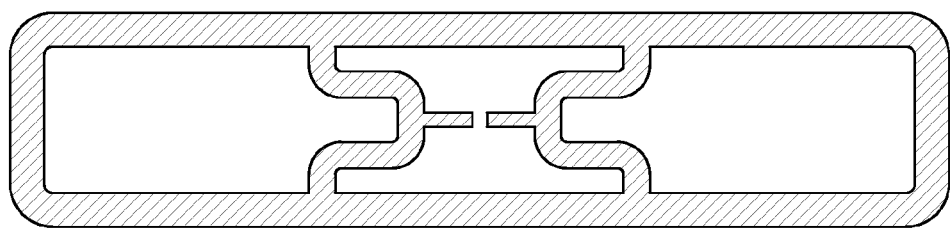
FIG. 17    1700
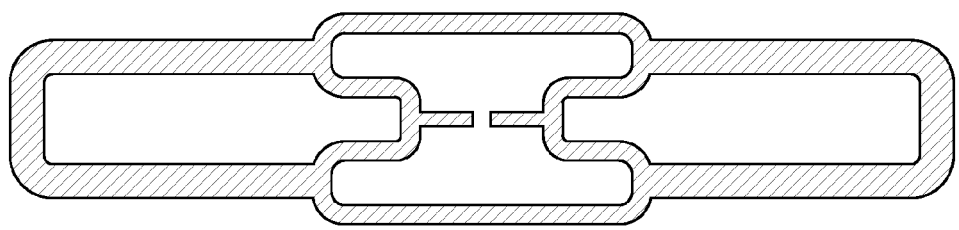
FIG. 18    1800
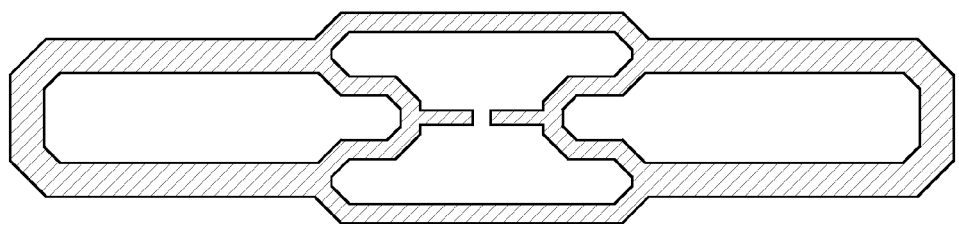
FIG. 19    1900

RFID TAG AND RFID TAG ANTENNA

BACKGROUND

1. Field

This invention relates generally to radio wave antennas and more particularly to a balanced doublet dipole antenna.

2. Related Art

An RFID system includes an RFID tag and an RFID reader. The reader includes a radio frequency (RF) transmitter and an RF receiver. The tag includes a microchip and an antenna. One type of tag is a passive tag which lacks its own power supply. One type of passive tag receives far-field EM waves transmitted by a reader. Typically, the far-field EM waves are modulated using a type of amplitude shift keying (ASK) to convey power to this type of passive tag via the EM waves. The antenna of the passive tag is tuned to a particular frequency, and the antenna of the passive tag is designed such that it has a preselected impedance. Terminals of the antenna of the passive tag are coupled to input terminals of the microchip of the passive tag.

If the preselected impedance of the antenna matches an input impedance of the input terminals of the microchip, the antenna absorbs much of the energy that reaches it at the particular frequency range. Such energy appears across the input terminals of the microchip. A diode in the microchip rectifies the AC voltage, and the rectified voltage is stored in a capacitor of the microchip. The microchip uses the stored rectified voltage to power itself, and, more specifically, to change its input impedance over time. The microchip changes its input impedance between two states: one state is closely matched to the preselected impedance of the antenna and another state is greatly mismatched to the preselected impedance of the antenna. An input impedance of a microchip and an impedance of an antenna are closely matched when they are complex conjugates of each other.

When the impedance of the microchip is greatly mismatch to the impedance of the antenna, most of the EM waves that reaches the antenna at the particular frequency is reflected from the antenna. Such reflection is called back scattering. As a result of the microchip changing its input impedance, such back scattering of the EM waves is modulated. The modulation encodes at least identification of the passive tag. During an interval that the reader is not transmitting, some of the EM waves that the passive tag back scatters are received by the reader, and the reader receives the identification of the passive tag. The reader may be coupled to a computer that processes the identification of the passive tag.

Important performance characteristics of an RFID antenna are impedance, bandwidth and gain. Important performance characteristics of an RFID tag are sensitivity, turn-on power, and return loss. An important performance characteristic of an RFID system is reading range which is a maximum distance at which a reader can either read information from, or write information to, a tag. Reading range is determined by a rate of successful reads or by a rate of successful writes, which varies with distance and which depends on characteristics of the reader, characteristics of the tag, and on a propagation environment.

RFID technology includes a low frequency band, a high frequency band, an ultra-high frequency (UHF) band, and a microwave band. Each International Telecommunication Union region has its own specific frequency allocation within the UHF band. For example, Europe (Region 1) allocates 866-869 MHz, North and South America (Region 2) allocates 902-928 MHz, and Asia (Region 3) allocates 950-956 MHz. The frequency range 902-928 MHz is also referred to as an industrial, scientific and medical (ISM) radio band. It should be noted that the central frequency of this ISM band is 915 MHz.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

FIG. 1 is a top plane view of an antenna in accordance with one embodiment of the invention, and illustrating a feeder length distance.

FIG. 2 is a top plane view of the antenna of FIG. 1, illustrating segments thereof.

FIG. 5 is a top cut-away view of an RFID tag in accordance with one embodiment of the invention, illustrating the antenna of FIG. 1, a substrate and an integrated circuit.

FIG. 6 is a side view of the RFID tag of FIG. 5.

FIGS. 16-23 show antennas in accordance with other embodiments of the invention.

DETAILED DESCRIPTION

Figure 3:
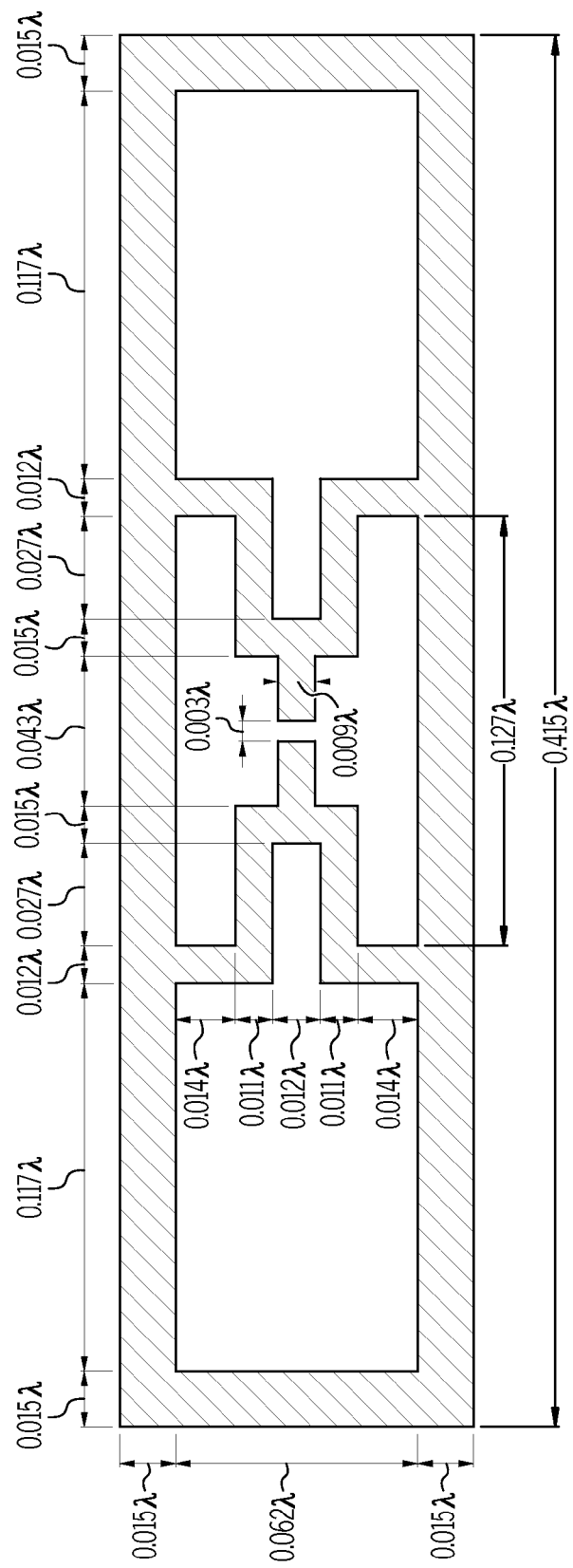
FIG. 3 is a top plane view of the antenna of FIG. 1, illustrating size of the antenna in terms of wavelength, when designed for a central frequency in the UHF band.

The microchip used in an RFID tag (hereinafter "tag") can be equivalently represented by a parallel circuit consisting of an internal resistance and a capacitor. A tag antenna (hereinafter "antenna") can be equivalently represented by a parallel circuit consisting of a radiation resistance and an inductor. The antenna is designed such that, when the microchip and the antenna are connected in parallel, the capacitance of the microchip and the inductance of the antenna can resonate with each other at a central operating frequency, for maximum power transfer.

Due to the use of a capacitor in the microchip, the input impedance of the microchip has a complex value including a negative imaginary component. To achieve optimal sensitivity, the impedance of the antenna should be a conjugate of the impedance of the microchip. This is so that the reflection of energy between the antenna and the microchip is as small as possible. Therefore, the impedance of the antenna should have a same real component as the impedance of the microchip, and have a positive imaginary component.

One application of an RFID system is in an electronic toll collection (ETC) system for a vehicular road. An ETC system includes vehicles that have a tag specifically for use with the ETC system (hereinafter "ETC tag"), and an arched portal including at least an antenna and a reader for reading identification information stored in an embedded memory of the ETC tag. Reading such identification information by the reader of the arched portal is required to accomplish a transaction such as payment of a toll. A vehicle on the road may pass under the arched portal at a high speed, e.g., 160 km/h or 99.42 mph. To ensure successful accomplishment of the transaction, the reader of the arched portal should receive at least five valid readings from the ETC tag on each vehicle passing under the arched portal. Therefore, with some ETC systems, the ETC tag on such vehicles should have a minimum sensitivity of −14 dBm in the ISM band to guarantee that the reader of the arched portal successfully reads the identification information at least five times. To accomplish the minimum sensitivity of −14 dBm, the impedance of the microchip of the ETC tag and the impedance of the antenna of the ETC tag should be matched, so that power losses are minimized.

Designing an antenna for the ETC tag so that the antenna has a required gain and optimal geometry is a very complex process. Typically, the ETC tag, including the antenna, is affixed to a vehicular window, such as a windshield, and a side of the window that is inside the vehicle. Performance of known antennas for ETC tags degrades when they are in close proximity to a vehicular window. A vehicular window typically comprises laminated glass which consists of a layer of glass on each side of a layer of polyvinyl butyral (PVB). The dielectric constant for glass is typically $\in$=7.0 and $\delta$=0.03, and the dielectric constant for PVB is typically $\in$=3.0 and $\delta$=0.05, at about 1 GHz.

FIG. 1 is a top plane view of an OSM antenna (hereinafter "antenna") 100 in accordance with one embodiment of the invention. In one embodiment, the antenna 100 is planar. The antenna 100 comprises a first dipole 110, a second dipole 120, a first feeder portion 130 and a second feeder portion 140. The antenna 100 is disposed on a planar substrate 501 (not shown in FIGS. 1-4, see FIG. 5). In the embodiment illustrated in FIG. 1, the first dipole 110, the second dipole 120, the first feeder portion 130 and the second feeder portion 140 comprise electrical conductors, or conductive microstrips, 160 (hereinafter "microstrips"). Each dipole 110 and 120 has a length of approximately half of a wavelength electrically. In general, a length of a dipole determines a frequency of operation. The material of the microstrips 160 is an electrically conductive material. In some embodiments, the material of the microstrips 160 is metal. In one embodiment, the material of the microstrips 160 is one of copper, aluminum and silver, or alloys thereof. At a given operating frequency, the dimensions of the antenna 100 depend upon the material of the microstrips 160. The microstrips 160 of the antenna 100, including the microstrips of the first dipole 110, the second dipole 120, the first feeder portion 130 and the second feeder portion 140, are formed integrally with one another as a single, continuous microstrip.

The antenna 100 includes a two-terminal feed 150 consisting of a first terminal 151 and a second terminal 152. The first feeder portion 130 is coupled to the first terminal 151, and the second feeder portion 140 is coupled to the second terminal 152. The first feeder portion 130 is also coupled to the first dipole 110 at a first junction 171 and at second junction 172. The first and second junctions 171 and 172 are located a feeder length distance 180 apart. The second feeder portion 140 is also coupled to the second dipole 120 at a third junction 173 and at a fourth junction 174. The third and fourth junctions 173 and 174 are also located the feeder length distance 180 apart. The antenna 100 has an impedance, at the two-terminal feed 150, that is determined, at least in part, by the feeder length distance 180.

Portions of the first dipole 110 that are farthest from the first feeder portion 130 are conductively connected, i.e., shorted, to respective corresponding portions of the second dipole 120 that are farthest from the second feeder portion 140; the microstrips 160 of the dipoles 110 and 120 thereby form a polygon. In FIG. 1, lines 190 and 191 indicate, for purposes of analysis only, a demarcation between the first dipole 110 and the second dipole 120. However, because the first dipole 110 and the second dipole 120 are formed integrally with each other, lines 190 and 191 do not physically exist. In one embodiment, the polygon is a quadrilateral. In another embodiment, the quadrilateral is a rectangle. In FIGS. 1-5, the microstrips 160 of the dipoles 110 and 120 are shown forming a rectangle.

In the one embodiment in which the material of the microstrips 160 is copper, the antenna 100 has a width of about 30 mm and an overall length of about 137 mm, which is about 0.091$\lambda$ by 0.42$\lambda$, where $\lambda$ is the wavelength in free space when the central frequency of the antenna is 915 MHz. In one embodiment, the antenna 100 is printed in copper on a polyethylene substrate 501. In one embodiment, the substrate 501 is polyethylene, which has a relative permittivity $\in_r$ of about 2.3. In such one embodiment, a thickness of the polyethylene is about 50 µm. A thickness of the copper of the microstrips 160 is less than about 100 µm. In one embodiment, the thickness of the copper of the microstrips 160 is 45 µm. In one embodiment, a total thickness of the antenna 100 is 88 µm.

In one embodiment, the antenna 100 is formed by stamping or etching its structure from a conductive sheet. In another embodiment, the antenna 100 is formed by printing conductive ink on a substrate 501 such as polyimide, polyethylene terephthalate (PET), polyester, polyurethane or paper. In another embodiment, the antenna 100 is formed by printed conductive traces. In another embodiment, the antenna comprises conductive foils.

In one embodiment, the microstrips 160 are formed at a same time and are integral with each other. Although the microstrips 160 are formed at a same time and are integral with each other, for design, analysis and pedagogical purposes the microstrips may be considered to be composed of several segments.

FIG. 2 illustrates the several segments of the microstrips 160. FIG. 2 also illustrates that the microstrips of the dipoles 110 and 120 form a rectangle having a left half 201 and a right half 202. A first set 203 of additional microstrips is located within the left half 201 of the rectangle. A second set 204 of additional microstrips is located within the right half 202 of the rectangle. The additional microstrips form the feeder portions 130 and 140. The rectangle has a major and a minor axis. In FIGS. 1-5, the major axis is horizontal and the minor axis is vertical. The antenna 100 is symmetrical about both its major and minor axes. Therefore, the right half 202 of the antenna 100 is a mirror of the left half 201 of the antenna. The first feeder portion 130 is symmetrical about the minor axis of the rectangle. The second feeder portion 140 is symmetrical about the minor axis of the rectangle. In FIG. 2, the segments are arbitrarily assigned letters A, B, C, D, E, F and G. Each segment has its own unique combination of length and width, except that segments that have a same letter assignment share a same combination of length and width. When the antenna 100 is designed for a central frequency in the UHF band, the "E" segments have the longest length, the "F" segments have a length that is 86.9% of the longest length, the "G" segments have a length that is 71.4% of the longest length, the "D" segments have a length that is 19.0% of the longest length, the "C" segments have a length that is 21.4% of the longest length, the "B" segments have a length that is 23.8% of the longest length, and the "A" segments have a length that is 15.5% of the longest length. When the antenna 100 is designed for a central frequency in the UHF band, segments E, F, G and B have the widest width. The "D" segments have a width that is 80% of the widest width, the "C" segments have a width that is 70% of the widest width, and the "A" segments have a width that is 60% of the widest width. The lengths and widths of each segment depend on a central frequency to which the antenna is tuned. For example, as the central frequency decreases, the length of each segment increases. In particular, as the central frequency changes within the UHF band, the length of each segment maintains a same proportional relationship, as indicated above. As a separate concept, at any given central frequency, changing the sizes of some or all of segments A, B, C and D changes the impedance of the antenna 100.

FIG. 3 is a top plane view of the antenna 100 illustrating size, described in terms of wavelength, of each portion of the antenna when the antenna is designed for a central frequency in the UHF band. Of course, the physical size of each portion of the antenna 100 depends upon a value of the central frequency for which the antenna is designed. However, regardless of the value of the central frequency for which the antenna 100 is designed, each portion of the antenna maintains the relationship, in terms of wavelength, shown in FIG. 3, provided that the central frequency is within the UHF band.

Figure 4:
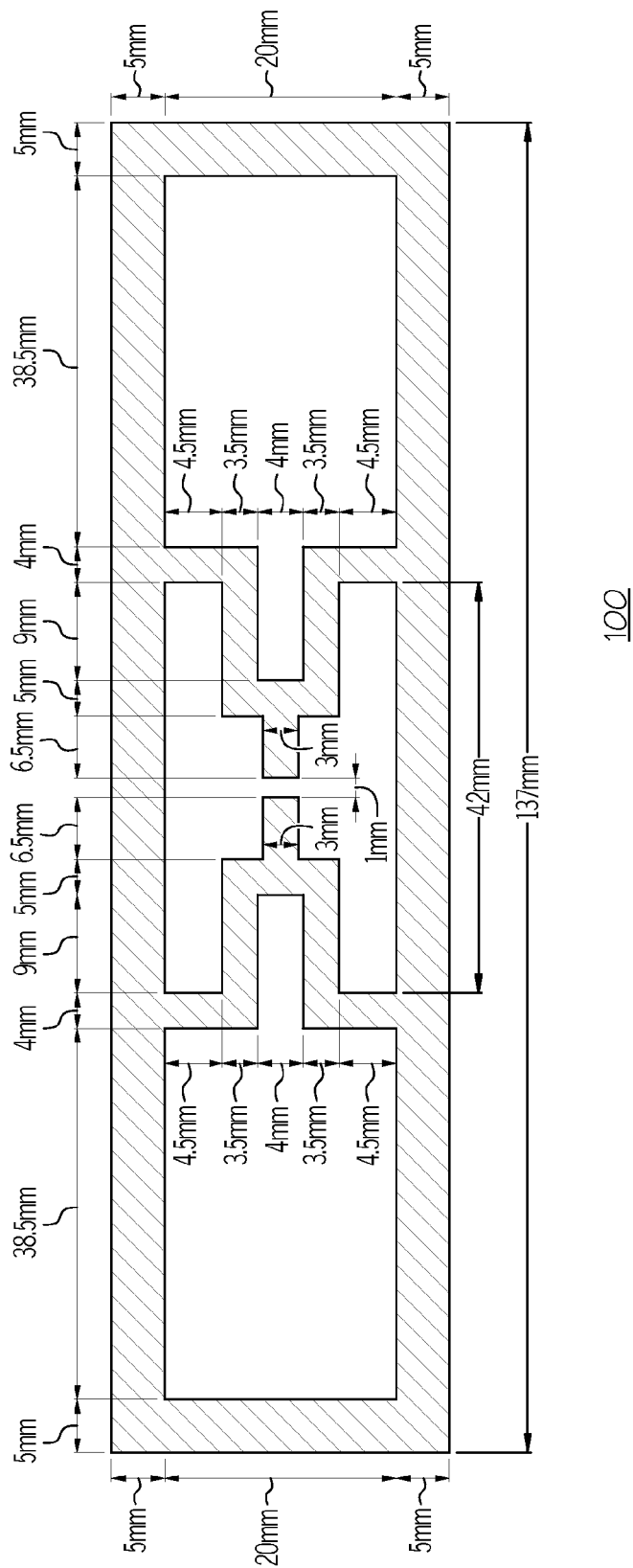
FIG. 4 is a top plane view of antenna of FIG. 1, illustrating size of the antenna in terms of millimeters, when designed for a central frequency of 915 MHz.

FIG. 4 is a top plane view of antenna 100, illustrating size of the antenna in terms of millimeters, when the antenna is designed for a central frequency of 915 MHz and a preselected impedance of 26Ω-j170Ω. For example, FIG. 4 shows that the overall length of the antenna 100 is 137 mm and the width of the antenna is 30 mm. For example, FIG. 4 also shows that the length of the first dipole 110 is 157 mm, and that the length of the second dipole 120 is 157 mm. FIG. 4 also shows that the width of the microstrips 160 that form the first dipole 110 is 5 mm, and that the width of the microstrips that form the second dipole 120 is 5 mm. FIG. 4 further shows that the width of the microstrips 160 that form the first and second feeder portions 130 and 140 is less than or equal to the width of the microstrips that form the first and second dipoles 110 and 120.

In general, the following factors primarily determine inductance of the antenna 100: a length of the microstrips 160, a width of the microstrips, and a size of the feeder portions 130 and 140. Because the antenna 100 is symmetrical about its major and minor axis, the size of each feeder portion 130 and 140 is identical. The size of the feeder portions 130 and 140 is determined, in part, by the locations at which each feeder portion is coupled to its respective dipole. In general, the following factors primarily determine resistance of the antenna 100: material of the microstrips 160, a length of the microstrips, a width of the microstrips, and a thickness of the microstrips.

FIG. 5 is a top cut-away view of a tag 500 in accordance with one embodiment of the invention. The tag 500 includes a planar substrate 501, the antenna 100, and an integrated circuit, or microchip 502. The microchip 502 includes a two-terminal input (not shown) that is coupled to the two-terminal feed 150 of the antenna 100. The tag 500 may also include an outer covering, or wrapper, 503 of electrically insulating material. The wrapper 503 covers at least the antenna 100. In one embodiment, the wrapper 503 covers the antenna 100 and the microchip 502. In another embodiment, the wrapper 503 covers the antenna 100, the microchip 502 and the substrate 501. In one embodiment, the wrapper 503 is paper. In another embodiment, the wrapper 503 is plastic. In yet another embodiment, the wrapper 503 is fabric. The microchip 502 has a size of about 1 mm square and about 0.2 mm thick. In other embodiment, the microchip 502 is without any encapsulation. In another embodiment, the microchip 502 is encapsulated by epoxy or another mold compound. Many microchips have a resistance in the range of 5-30Ω and a reactance in the range of 100-900Ω at 915 MHz. One example of a microchip has an input impedance Z of 15Ω-j220Ω. When the one example of a microchip is encapsulated in a quad flat no-lead (QFN) package, the one example of a microchip has an impedance of 26.5Ω-j170Ω. Advantageously, the radiation impedance of the antenna 100 of the tag 500 is matched within a −20 dB return loss to the complex conjugate of the input impedance of the one example of a microchip.

FIG. 6 is a side view of the tag 500 illustrating the wrapper 503.

Tag turn-on power is the power that a reader measures after completion of a reading cycle in given a measurement setup. When the impedance of the antenna 100 is matched to the impedance of the microchip 502, the reader reports less power in use by the tag to complete a full transaction; therefore, the value of the tag turn-on power is lower. The opposite happens when the antenna 100 is mismatched to the impedance of the microchip 502. A simulation was performed in which the measurement setup was calibrated so that it returns the minimum power used by the tag 500 to answer the reader.

Figure 7:
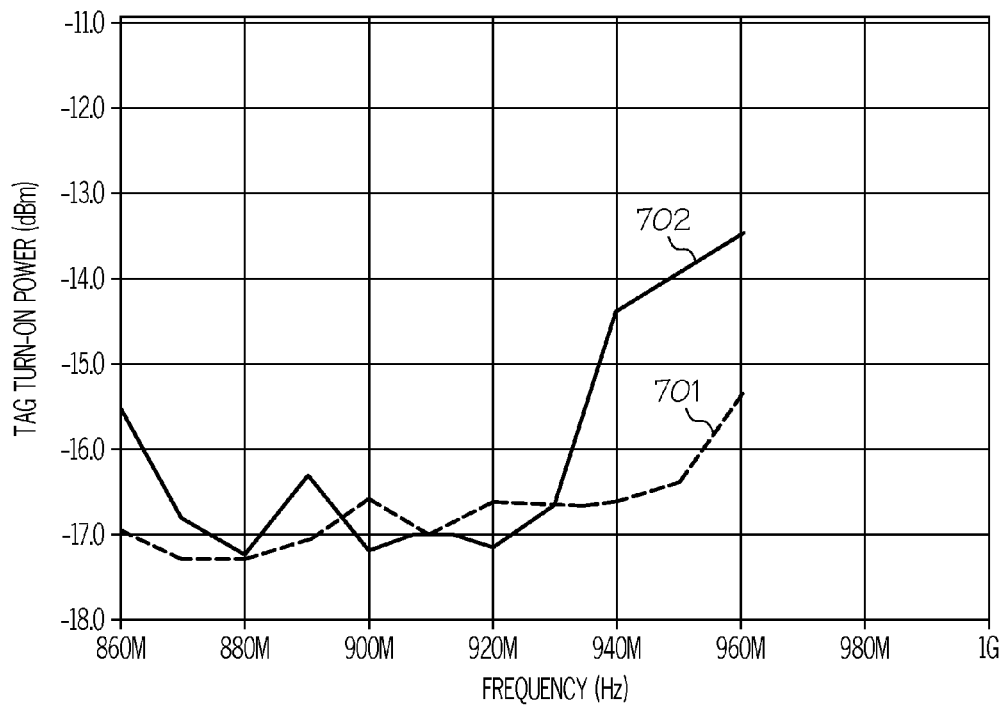
FIG. 7 is a graph illustrating turn-on power of a tag that includes the antenna of FIG. 1.

FIG. 7 is a graph illustrating simulation results for turn-on power of the tag 500 that includes the antenna 100, for frequencies within the ISM band. In FIG. 7, the horizontal axis represents frequency in units of Hertz (Hz), and the vertical axis represents tag turn-on power in units of decibel-milliwatts (dBm). Curve 701 represents the turn-on power of the tag 500 when it is in air, i.e., when it is relatively far from other objects. Curve 702 represents the turn-on power of the tag 500 when it is in close proximity to a windshield. FIG. 7 illustrates that the turn-on power of the tag 500 is advantageously nearly flat within the ISM band for curve 701 and for curve 702. FIG. 7 also illustrates that the turn-on power of the tag 500 is −17 dBm at 915 MHz for curve 701 and for curve 702.

Return loss is a parameter that indicates a degree of matching between an antenna and its load. Return loss is also known as one of the scattering parameters, S11, or the input port voltage reflection coefficient, where "1" is the port label. A graph of the parameter S11 versus frequency is also called a return loss curve of an antenna. For optimal performance, the return loss curve should show a dip at the operating frequency and should have a decibel value at this frequency of −10 dB of less. Return loss is a function of a tag-antenna combination only. The return loss does not depend on the reader.

Figure 8:
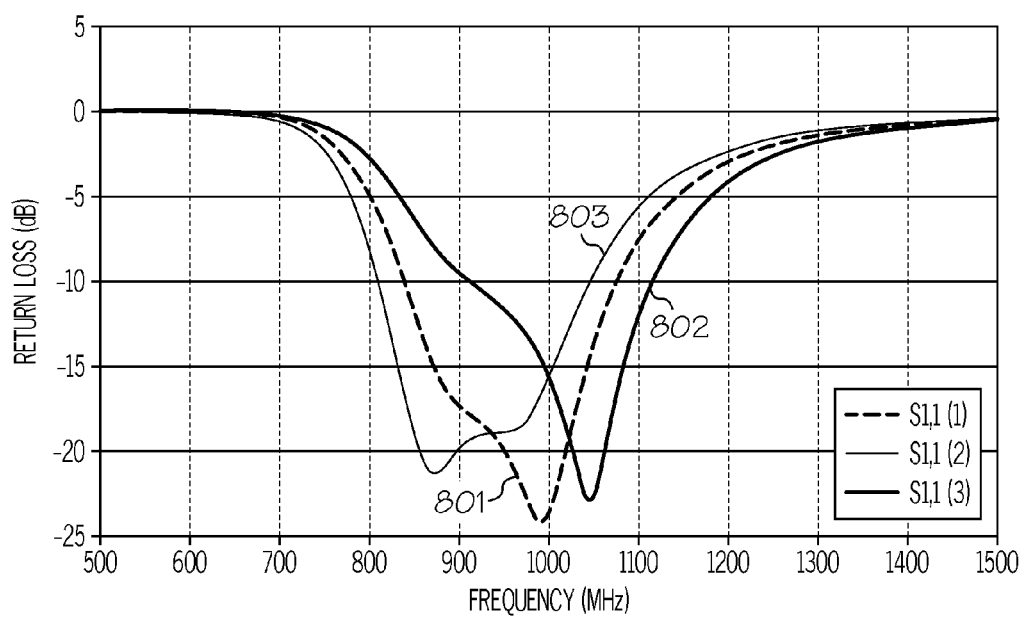
FIG. 8 is a graph of return losses for the antenna of FIG. 1 and for two other antennas.

FIG. 8 is a graph of return losses, or electric responses, for five (5) antennas that have topologies that are similar to the topology of antenna 100 but with a change in one of two different lengths. In FIG. 8, the horizontal axis represents frequency in units of MHz, and the vertical axis represents magnitude of S11, or return loss, in units of decibels (dB). The electric responses illustrated in FIG. 8 are for antennas in free space (no dielectric present). As each antenna is moved to the vicinity of a dielectric (and dispersive material), its electric response changes. Curve 801 is the electric response of antenna 100 which has a central frequency of 915 MHz, an overall length of 137 mm, and a feeder length distance 180 of 42 mm.

Curve 802 is the electric response of a second antenna (not shown), also having a central frequency of 915 MHz and an overall length of 137 mm, and which is similar in topology to antenna 100 except that the second antenna has a feeder length distance that is 39 mm, or 3 mm less than the feeder length distance 180 of antenna 100. Because the feeder length distance of the second antenna is less than the feeder length distance 180 of antenna 100, the resistance at the two-terminal feed of the second antenna is smaller than the resistance at the two-terminal feed of antenna 100. The resistance at the two-terminal feed of the second antenna is about 13.9Ω. Because the feeder length distance of the second antenna is less than the feeder length distance 180 of antenna 100 the inductive reactance at the two-terminal feed of the second antenna at 915 MHz is less than the inductive reactance at the two-terminal feed of antenna 100 at 915 MHz. The inductive reactance at the two-terminal feed of the second antenna at 915 MHz is about 204Ω.

Curve 803 is the electric response of a third antenna (not shown) that has a feeder length distance of 42 mm, and which is similar in topology to antenna 100 except that the third antenna has an overall length of 139 mm, or 2 mm longer than antenna 100, and, therefore, has a central frequency that is lower than 915 MHz. The third antenna has a central frequency of about 900 MHz. Because the overall length of the third antenna is greater than the overall length of antenna 100, the resistance at the two-terminal feed of the third antenna is larger than the resistance at the two-terminal feed of antenna 100. Because the overall length of the third antenna is greater than the overall length of antenna 100 the inductive reactance at the two-terminal feed of the third antenna at 915 MHz is greater than the inductive reactance at the two-terminal feed of antenna 100 at 915 MHz. For all three curves 801, 802 and 803 shown in FIG. 8, the width of each segment of the microstrips 160 of the corresponding antenna remains unchanged.

A generally accepted definition of bandwidth of an RFID antenna is the frequency range in which a return loss of the antenna is ≤10 dB. FIG. 8 also illustrates that the bandwidth of the antenna 100 is about 240 MHz (≈1080 MHz-840 MHz), as illustrated by curve 801.

Advantageously, the impedance Z of the antenna 100 at its terminals 151 and 152 can be adjusted so that it matches impedance of its load $Z_{load}=r+jX_C$, where 0<r≤100Ω, where 0Ω<$X_C$<300Ω, and where r<$X_C$. In one embodiment, the load is the input of the microchip 502.

By slightly changing the size of some or all of the segments of the microstrip 160, while maintaining a same topology for the antenna 100, the impedance of the antenna at its terminals 151 and 152 can be adjusted to any impedance within a certain range. The impedance Z of the antenna 100 can be expressed by $Z(f)=R(f)+jX_L(f)$, where f is the frequency and $X_L$ is the inductive reactance, and where R consists of two components, a radiation resistance and a loss resistance. The power associated with the radiation resistance is radiated by the antenna 100. The power associated with the loss resistance is lost as heat in the antenna 100, due to dielectric or conducting losses. The inductive reactance $X_L$ represents power stored in the near field of the antenna 100.

The certain range in which the impedance of the antenna 100 can be adjusted is defined by an interval of frequency such that the return loss is less than or equal to −10 dB. The return loss depends, at least in part, on frequency. There is an $f_{min}$ and an $f_{max}$ for which the return loss is less than or equal to −10 dB. For the antenna 100, it has been determined from simulation that $f_{min}=f\times 0.8$ and $f_{max}=f\times 1.2$, where f is the central frequency of the antenna. In other words, changes up to 20% in the central frequency are allowed for the antenna 100. For example, for a central frequency of 915 MHz, $f_{min}=732$ MHz and $f_{max}=1.098$ GHz. Consequently, $f_{min}$ and $f_{max}$ are, respectively, the minimum and maximum frequency thresholds above and below which, respectively, the suitable bandwidth for the antenna 100 can be obtained while maintaining the same topology.

Figure 9:
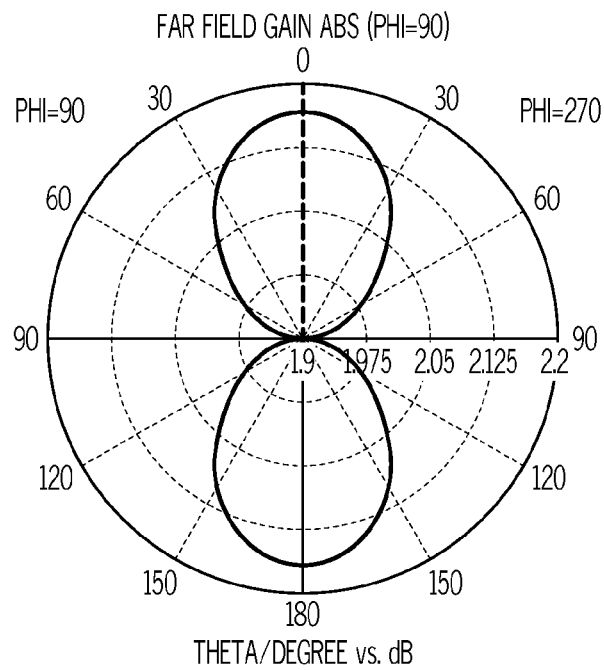
FIG. 9 is a chart of elevation radiation pattern of the antenna of FIG. 1.

FIG. 9 is a chart of an elevation radiation pattern of the antenna 100 in free space at about 915 MHz. FIG. 9 shows that the gain of the antenna 100 is 2.15 dB. However, when the antenna 100 is very close to a vehicular windshield, the gain of the antenna increases to 3.09 dB due to the presence of the vehicular windshield whose layers act as dielectric waveguides that increase directivity of the antenna.

Figure 10:
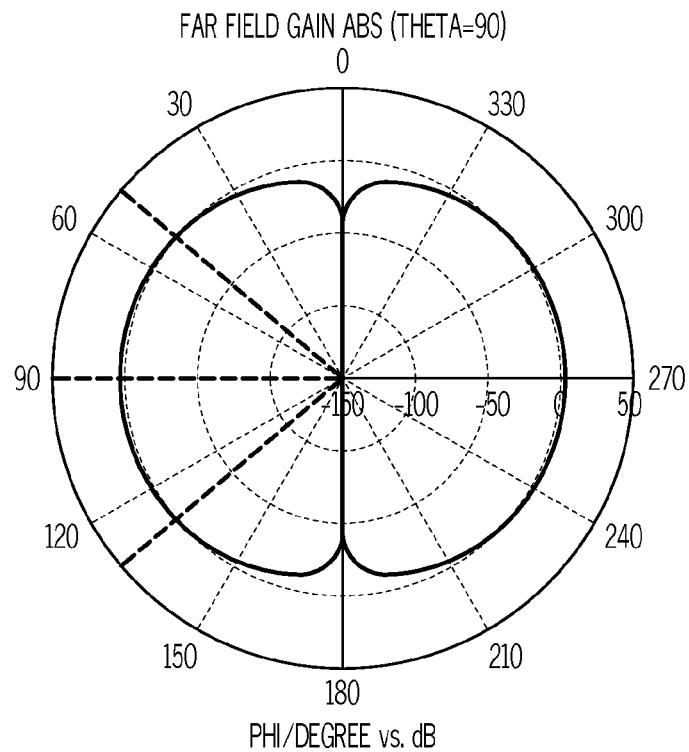
FIG. 10 is a chart of azimuth radiation pattern of the antenna of FIG. 1.

FIG. 10 is a chart of an azimuth radiation pattern of the antenna 100 in free space at about 915 MHz.

Figure 11:
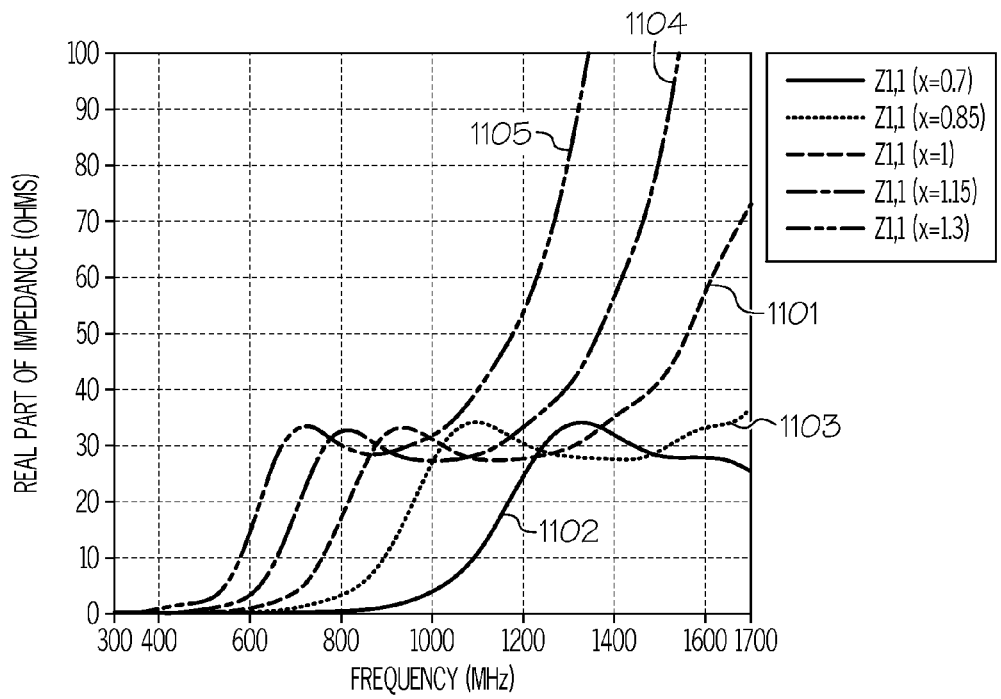
FIG. 11 is a parametric plot of real part of impedance of the antenna of FIG. 1.

FIG. 11 is a parametric plot of a simulation of the real part of the impedance of the antenna 100 versus frequency, for each of five different sizes of the antenna. The horizontal axis represents frequency in units of MHz, and the vertical axis represents resistance of the antenna 100 at the feed 150 measured in units of ohms. Curve 1101 represents the resistance of antenna 100. Curve 1105 represents the resistance of a largest antenna of the five antennas. Curve 1102 represents the resistance of a smallest antenna of the five antennas. Curves 1103 and 1104 represent the resistances of antennas of intermediate sizes.

Figure 12:
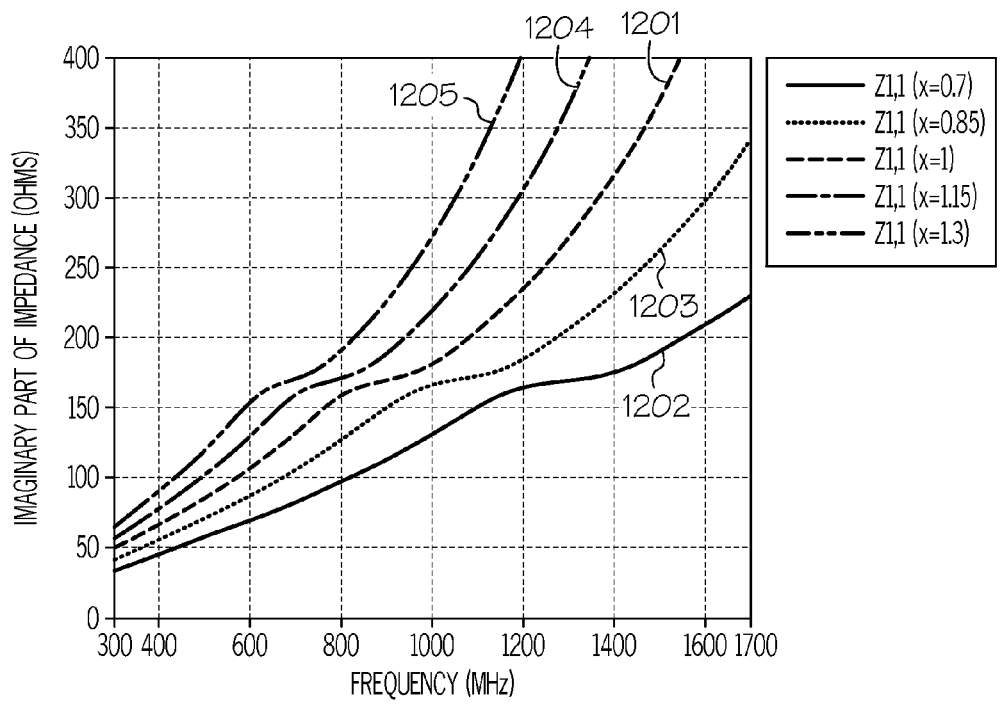
FIG. 12 is a parametric plot of imaginary part of impedance of the antenna of FIG. 1.

FIG. 12 is a parametric plot of a simulation of the imaginary part of the impedance of the antenna 100 versus frequency for each of the five different antenna sizes, where x is a scale parameter. The horizontal axis represents frequency in units of MHz, and the vertical axis represents inductive reactance of the antenna 100 at the feed 150 measured in units of ohms. Curve 1201 represents the inductive reactance of antenna 100. Curve 1205 represents the inductive reactance of the largest antenna of the five antennas. Curve 1202 represents the inductive reactance of the smallest antenna of the five antennas. Curves 1203 and 1204 represent the inductive reactances of antennas of intermediate sizes. The simulations that provided the parametric plots of FIGS. 11 and 12 were performed using CST MICROWAVE STUDIO® software sold by CST Computer Simulation Technology AG of Darmstadt, Germany, and under the following simulated environmental conditions and circuitry assumptions: twenty (20) lines per wavelength of minimum mesh density with a lower limit of fifteen (15) lines per wavelength. To the resulting numerical model, boundary conditions were applied, within a box of 122×63×25 points. The highest simulation frequency in each case was always equal to the highest frequency in each return loss plot.

Figure 13:
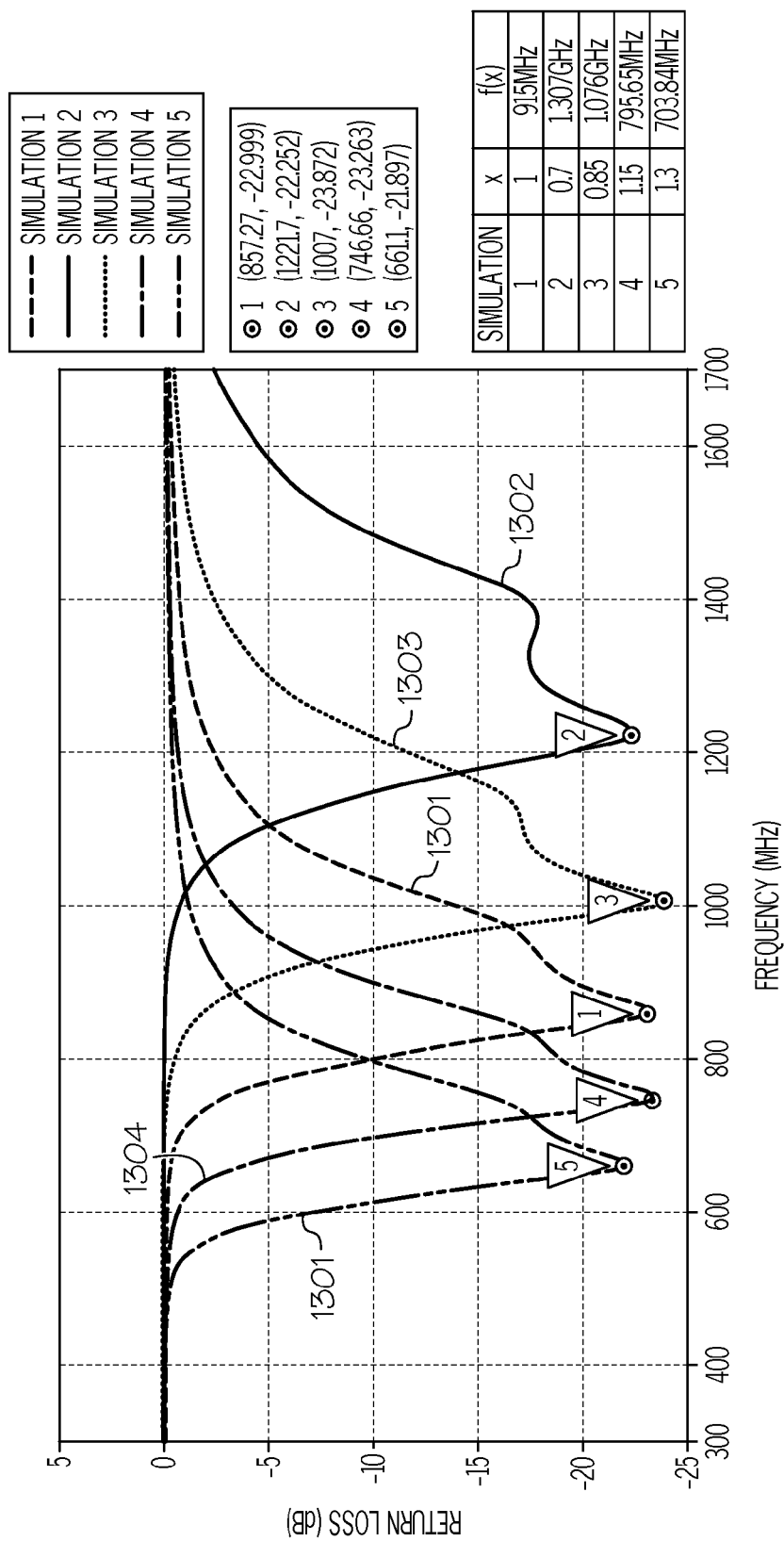
FIG. 13 is a graph of return loss of five different sizes of the antenna of FIG. 1.

FIG. 13 is a graph of the return loss, or electric response, of the antenna 100 and of four other antennas having a same topology but having different sizes. The horizontal axis represents frequency in units of MHz, and the vertical axis represents return loss in units of dB. Advantageously, the central frequency of the antenna 100 is scalable to a plurality of frequencies by modifying the dimensions of the antenna while maintaining a same topology of the antenna. For example, FIG. 13 illustrates simulation results when all geometrical parameters (including the widths of the microstrip 160) of the antenna 100 are multiplied by a factor x, where x=1 for the antenna 100. The simulation results are for a central frequency of 915 MHz. In the simulation, the factor x was changed from 0.7 to 1.3. In FIG. 13, f(x) is a corresponding central frequency for the antenna 100 scaled by the factor x. The simulations were conducted for an encapsulated chip impedance of 26Ω-j170Ω. Changing the factor x from 0.7 to 1.3 corresponds to a dynamic response range from 612 MHz to 1.482 GHz. For simulation run "5" (x=1.3), the minimum frequency is 661 MHz and the band (≤10 dB) goes from 612 MHz to 795 MHz, as shown by curve 1305. For simulation run "4" (x=1.15), the minimum frequency is 746.6 MHz and the band (≤10 dB) goes from 696 MHz to 897 MHz, as shown by curve 1304. For simulation run "1" (x=1.0), the minimum frequency is 857.3 MHz and the band (≤10 dB) goes from 802 MHz to 1.03 GHz, as shown by curve 1301. For simulation run "3" (x=0.85), the minimum frequency is 1.007 GHz and the band (≤10 dB) goes from 942 MHz to 1.22 GHz, as shown by curve 1303. For simulation run "2" (x=0.7), the minimum frequency is 1.22 GHz and the band (≤10 dB) goes from 1.15 GHz to 1.48 GHz, as shown by curve 1302. As the value of x is increased or decreased from x=1 by a positive factor much less than 1.0, the shape of the S11 curve departs slightly from the shape of the S11 curve for factor x=1. The bandwidth decreases as the size of the antenna 100 increases because the wavelength increases. As the wavelength increases, any uniform change in the size of the antenna 100 impacts the bandwidth less. The simulation demonstrates that the antenna can be successfully tuned to other central frequencies merely by changing the size of the other geometric parameters of the antenna. Other simulations reveal that the gain increases slightly as the antenna 100 is tuned to higher central frequencies (such as 1.307 GHz), and that the gain decreases slightly as the antenna is tuned to lower central frequencies (such as 703.84 MHz).

Figure 14:
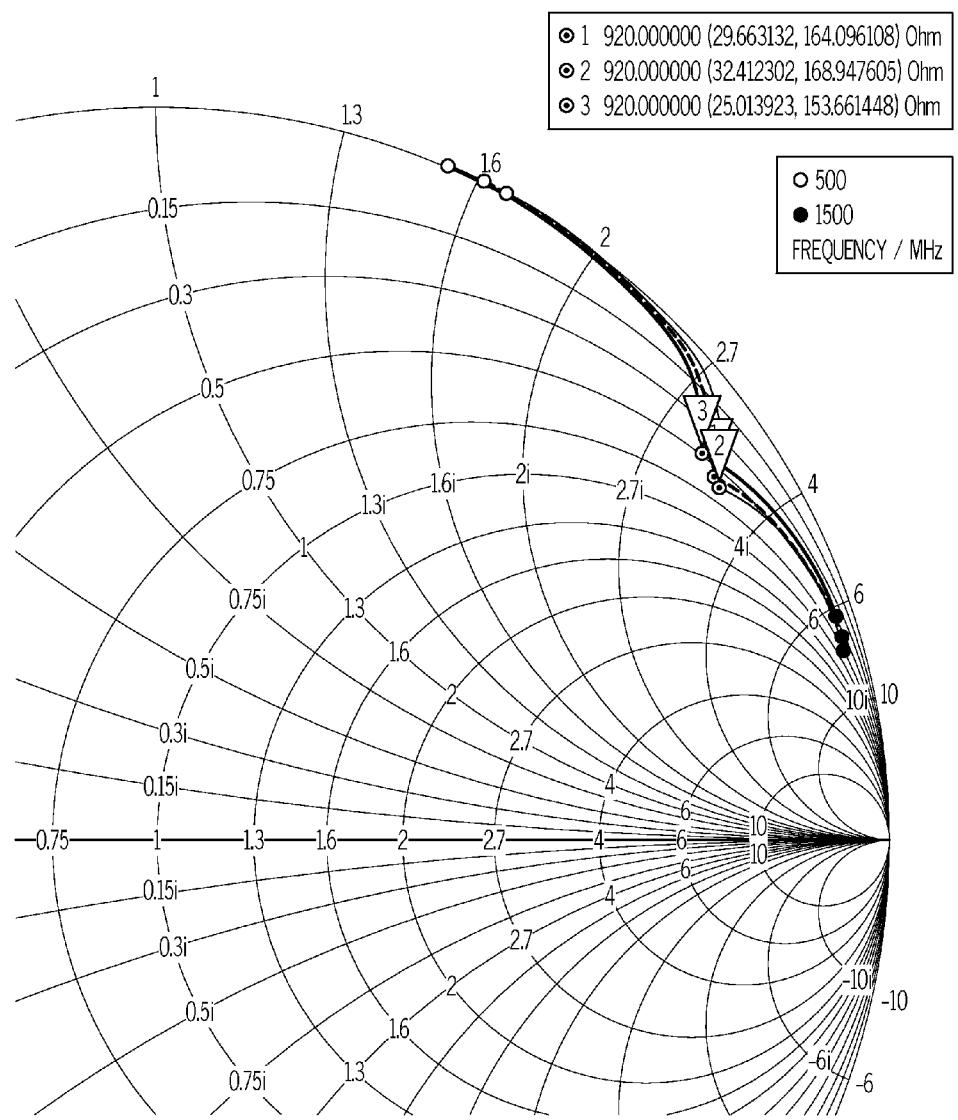
FIG. 14 is a plot on a Smith chart regarding the antenna of FIG. 1.
Figure 15:
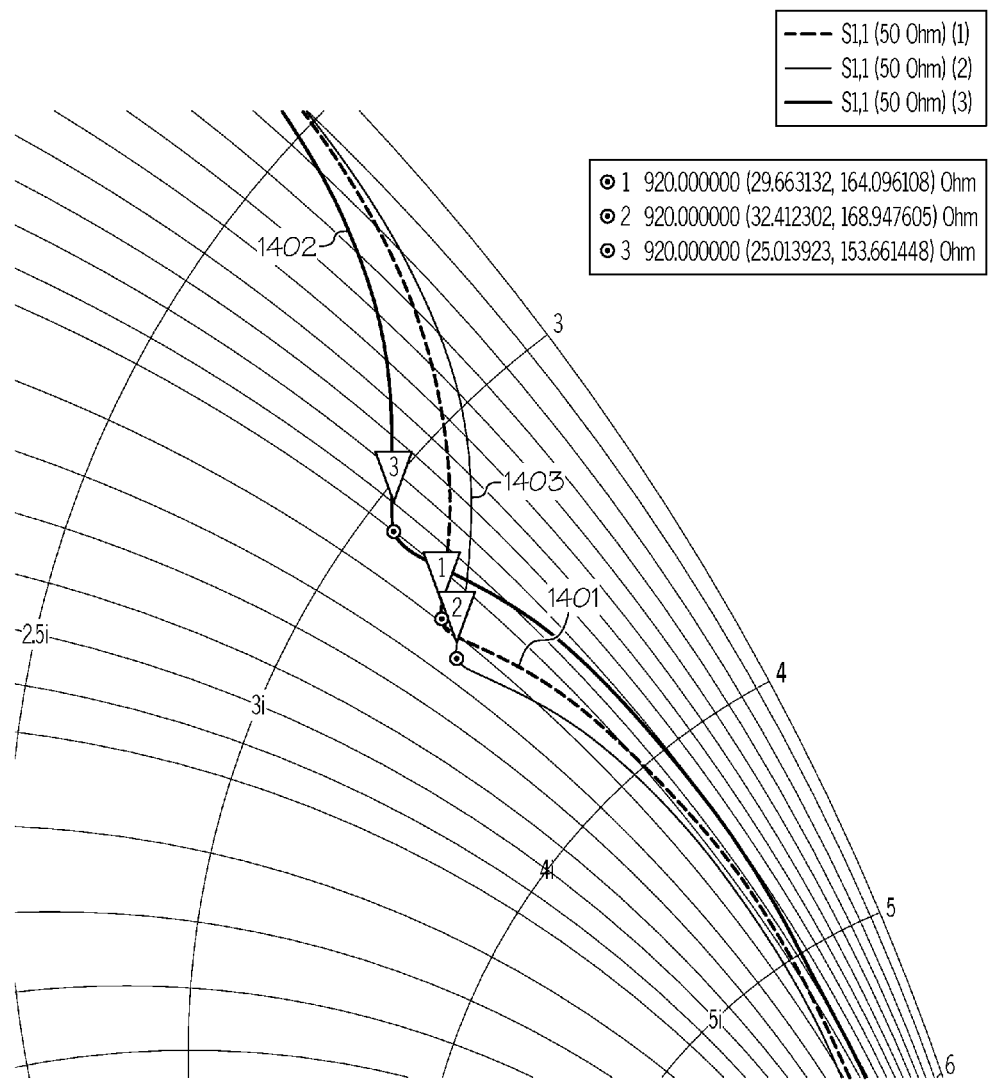
FIG. 15 is an enlargement of a portion of the Smith chart of FIG. 14.
Figure 20:
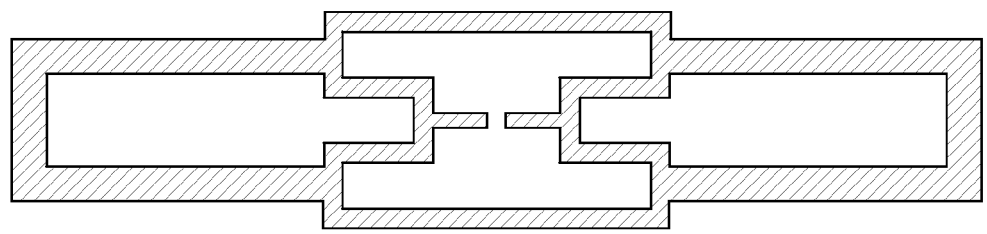
Figure 21:
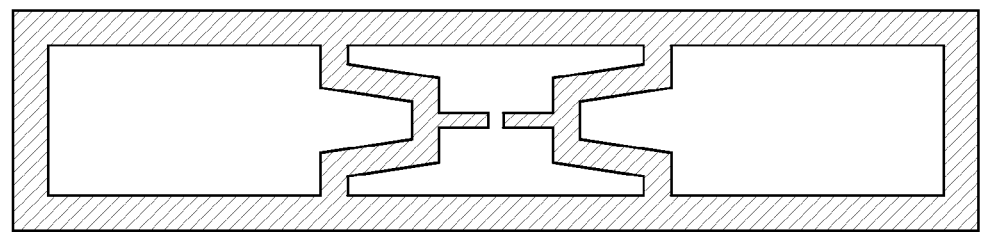
Figure 22:
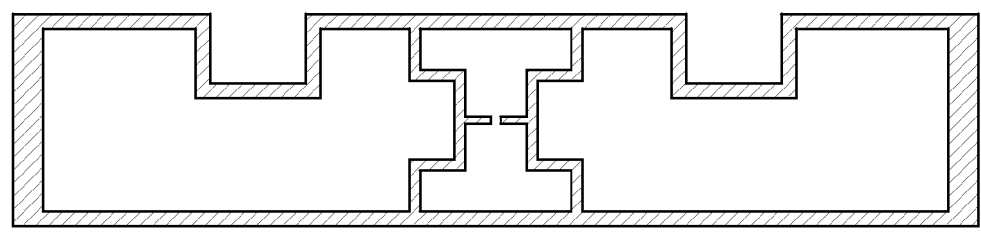
Figure 23:
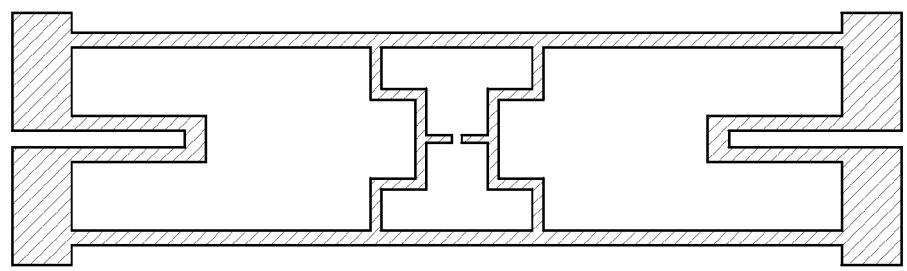

FIG. 14 illustrates return loss plots on a Smith chart for a 50Ω port for the antenna 100 and for two other antennas. FIG. 15 is an enlargement of a relevant portion of the Smith chart of FIG. 14. All values are multiplied by 50Ω because the return loss plots in FIGS. 14 and 15 are normalized. The circles that are almost concentric with the circle passing through the origin (1=50Ω) are lines of constant resistance (real part of Z). The orthogonal lines are constant reactance lines. Curve 1401 is a return loss plot for the antenna 100 which has an overall length of 137 mm and a feeder length distance of 42 mm. Curve 1402 is a return loss plot for the second antenna which has an overall length of 137 mm and a feeder length distance of 39 mm. A comparison of curve 1401 with curve 1402 shows that, as the feeder length distance 180 is shortened while the overall length remains unchanged, both the resistive and reactive parts of the impedance decrease. The opposite happens when only the overall length of the antenna 100 is increased. Curve 1403 is a return loss plot for the third antenna which has a length of 139 mm and a feeder length distance of 42 mm. A comparison of curve 1401 with curve 1403 shows that, as the overall length is increased while the feeder length distance remains unchanged, both the resistive and reactive parts of the impedance increase. The Smith chart also shows how the impedance of the antenna 100 behaves as a function of frequency. The reactive part increases dramatically (from 1.6Ω to 10Ω) as the frequency increases. The resistive part tends to follow an almost constant (concentric with constant resistance) curve. Note that all markers are fixed at 920 MHz.

Therefore, these are two possible mechanisms for tuning the antenna 100: either changing the overall length or changing the feeder length distance 180. It is sometimes better to change the feeder length distance 180 rather than the overall length, because the overall length may be fixed by fabrication constraints.

FIGS. 16-23 show antennas 1600, 1700, 1800, 1900, 2000, 2100, 2200 and 2300 in accordance with other embodiments of the invention.

The computational simulations were performed using the CST MICROWAVE STUDIO software and have shown a good match with the experimental results. The experimental results demonstrate the advantages of the antenna 100, such as simple structure and ease in frequency band adjustment. Moreover, the performance parameters (return loss and gain) of the antenna 100 are very good.

Although the antenna 100 has been described in terms of an RFID system that utilizes far-field EM waves, the antenna can also be used in an REID system that utilizes near-field waves.

Although the antenna 100 has been described in terms of an FTD system, the antenna can also be used with systems that do not involve RFID.

In one embodiment, the RFID antenna 100, which has an antenna terminal 150 and an impedance at the antenna terminal, comprises a substrate 501; electrical conductors attached to the substrate, wherein the electrical conductors form first and second dipoles 110 and 120; and additional electrical conductors attached to the substrate, wherein the additional electrical conductors form a first feeder portion 130 and a second feeder portion 140. The first and second feeder portions are coupled to the antenna terminal. The first feeder portion 130 is also coupled to the first dipole 110 at a first location 171 and at second location located 172 a feeder length distance 180 from the first location. The second feeder portion 140 is also coupled to the second dipole 120 at a third location 173 and at a fourth location 174 located the feeder length distance 180 from the third location. Portions of the first dipole 110 that are distal from the first feeder portion 130 are ohmically coupled to respective corresponding portions of the second dipole 120 that are distal from the second feeder portion 140, the first and second dipoles thereby forming a rectangle having a major axis. The impedance is determined, at least in part, by the feeder length distance 180.

In another embodiment, the radio frequency antenna 100, which has a two-terminal feed 150, comprises: a substrate 501; conductive strips 160 disposed on the substrate, the conductive strips forming first and second dipoles 110 and 120, wherein portions of the first dipole that are farthest from the two-terminal feed are conductively connected to respective corresponding portions of the second dipole, the conductive strips 160 thereby forming a polygon having a left half 201 and a right half 202; and a first set 203 of additional conductive strips disposed on the substrate and located within the left half 201 of the rectangle. The first set 203 of additional conductive strips includes: a first segment 211 having a length A, the first segment with a terminal end defining one terminal 151 of the two-terminal feed, and with a non-terminal end; a second segment 212 having a length B and being oriented perpendicular to the first segment, wherein the second segment has an upper end, a lower end, and a center point equidistant from the upper end and the lower end, and wherein the non-terminal end of the first segment is coupled to the center point; a third segment 213 having a length C and being oriented perpendicular to the second segment, the third segment with a right end coupled to the upper end of the second segment, and with a left end; a fourth segment 214 having a length D and being oriented perpendicular to the third segment, the fourth segment with a feeder end coupled to a left half of the first dipole 110, and with a non-feeder end coupled to the left end of the third segment; a fifth segment 215 having the length C and being oriented perpendicular to the second segment, the fifth segment with a right end coupled to the lower end of the second segment, and with a left end; and a sixth segment having the length D and being oriented perpendicular to the fifth segment, the sixth segment 216 with a feeder end coupled to a left half of the second dipole 120, and with a non-feeder end coupled to the left end of the fifth segment. The radio frequency antenna 100 also comprises a second set 204 of additional conductive strips disposed on the substrate and located within the right half 202 of the rectangle. The second set 204 of additional conductive strips is oriented as a mirror of the first set 203 of additional conductive strips. A mirror 224 of the fourth segment 214 and a mirror 226 of the sixth segment 216 are coupled to a right half of the first dipole 110 and to a right half of the second dipole 120, respectively. A terminal end of a mirror 221 of the first segment 211 defines a second terminal 152 of the two-terminal feed 150.

In yet another embodiment, a radio frequency identification (RFID) tag 500 comprises a planar substrate 501; an integrated circuit 502 which is disposed on the planar substrate and which has an input terminal (not shown) that has an input impedance; and a RFID antenna 100 which is disposed on the planar substrate and which has a feed terminal 150 coupled to the input terminal of the integrated circuit. The feed terminal 150 has a terminal impedance. The RFID antenna 100 includes electrical conductors disposed on the planar substrate, wherein the electrical conductors form first and second dipoles 110 and 120, and additional electrical conductors attached to the planar substrate, wherein the additional electrical conductors form a first feeder portion 130 and a second feeder portion 140, and wherein the first and second feeder portions are coupled to the antenna terminal. The first feeder portion 130 is also coupled to the first dipole 110 at a first location 171 and at second location 172 located a feeder length distance 180 from the first location. The second feeder portion 140 is also coupled to the second dipole 120 at a third location 173 and at a fourth location 174 located the feeder length distance 180 from the third location. The portions of the first dipole that are distal from the first feeder portion are connected to respective corresponding portions of the second dipole that are distal from the second feeder portion, the first and second dipoles thereby forming a rectangle. The terminal impedance is determined, at least in part, by the feeder length distance 180.

The term "coupled", as used herein, is defined as "connected", and encompasses the coupling of devices that may be physically, electrically or communicatively connected (according to context), although the coupling may not necessarily be directly, and not necessarily be mechanically.

The terms "a" or "an", as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an". The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

The terms "upper", "lower", "top", "bottom", "left", "right", and the like, in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The specification and figures are to be regarded in an illustrative rather than a restrictive sense, and all such modifications are intended to be included within the scope of the present invention. Any benefits, advantages or solutions to problems described herein with regard to specific embodiments are not intended to be construed as a critical, required or essential feature or element of any or all the claims.

The Detailed Description section, and not the Abstract section, is intended to be used to interpret the claims. The Abstract section may set forth one or more but not all embodiments of the invention, and the Abstract section is not intended to limit the invention or the claims in any way.

The specification and figures are to be regarded in an illustrative rather than a restrictive sense, and all such modifications are intended to be included within the scope of the present invention. Any benefits, advantages or solutions to problems described herein with regard to specific embodiments are not intended to be construed as a critical, required or essential feature or element of any or all the claims.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages or solutions to problems that are described herein with regard to specific embodiments are not intended to be construed as a critical, required, or essential feature or element of any or all the claims.

What is claimed is:

1. A radio frequency identification (RFID) antenna, the RFID antenna having an antenna terminal, the antenna having an impedance at the antenna terminal, the RFID antenna comprising:
    a substrate;
    electrical conductors attached to the substrate, wherein the electrical conductors form first and second dipoles; and
    additional electrical conductors attached to the substrate, wherein the additional electrical conductors include only electrical conductors that are one of parallel and perpendicular to the electrical conductors that form the first and second dipoles, wherein the additional electrical conductors form a first feeder portion and a second feeder portion, wherein the first and second feeder portions are coupled to the antenna terminal,
    wherein the first feeder portion is also coupled to the first dipole at a first location and at a second location located a feeder length distance from the first location, and wherein the second feeder portion is also coupled to the second dipole at a third location and at a fourth location located the feeder length distance from the third location,
    wherein portions of the first dipole distal from the first feeder portion are ohmically coupled to respective corresponding portions of the second dipole distal from the second feeder portion, the first and second dipoles thereby forming a rectangle having a major axis, and
    wherein the impedance is determined, at least in part, by the feeder length distance.

2. The RFID antenna of claim 1, wherein a first half of the RFID antenna on one side of the major axis is a mirror of a second half of the RFID antenna on another side of the major axis.

3. The RFID antenna of claim 1, wherein the impedance of the antenna is also determined, at least in part, by a first width of the electrical conductors that form the dipoles and by other widths of the additional electrical conductors that form the feeder portions.

4. The RFID antenna of claim 3, wherein the RFID antenna has a central operating frequency and a corresponding free-space wavelength (λ), wherein a length of each dipole is approximately 0.5λ, and wherein the feeder length distance is approximately 0.166λ.

5. The RFID antenna of claim 4, wherein the first width is approximately 0.015λ, and wherein the other widths are between approximately 0.015λ to approximately 0.0009λ.

6. The RFID antenna of claim 4, wherein the central operating frequency is 915 MHz, and wherein the impedance is within a range of 10Ω to 50Ω for the real part and −100Ω to −300Ω for the imaginary part, depending, at least in part, upon the feeder length distance.

7. The RFID antenna of claim 4, wherein the central operating frequency is 915 MHz, and wherein the feeder length distance is approximately 42 mm, and the impedance is 15Ω-j220Ω.

8. The RFID antenna of claim 4, wherein the central operating frequency is 915 MHz, and wherein a length of the electrical conductors that form the dipoles is approximately 157 mm, wherein a first width of the electrical conductors that form the dipoles is approximately 5 mm, and wherein other widths of the additional electrical conductors that form the feeder portions are between approximately 5 mm to approximately 3 mm.

9. The RFID antenna of claim 8, wherein the electrical conductors and the additional electrical conductors have a thickness of less than 100 μm.

10. The RFID antenna of claim 1, wherein the electrical conductors and the additional electrical conductors comprise metal.

11. A radio frequency antenna having a two-terminal feed, comprising:
   a substrate;
   conductive strips disposed on the substrate, the conductive strips forming first and second dipoles, wherein portions of the first dipole that are farthest from the two-terminal feed are conductively connected to respective corresponding portions of the second dipole, the conductive strips thereby forming a polygon having a left half and a right half;
   a first set of additional conductive strips disposed on the substrate and located within the left half of the polygon, the first set of additional conductive strips including:
      a first segment having a length A, the first segment with a terminal end defining one terminal of the two-terminal feed, and with a non-terminal end,
      a second segment having a length B and being oriented perpendicular to the first segment, wherein the second segment has an upper end, a lower end, and a center point equidistant from the upper end and the lower end, and wherein the non-terminal end of the first segment is coupled to the center point,
      a third segment having a length C and being oriented perpendicular to the second segment, the third segment with a right end coupled to the upper end of the second segment,
      a fourth segment having a length D and being oriented perpendicular to the third segment, the fourth segment with a feeder end coupled to a left half of the first dipole, and with a non-feeder end coupled to a left end of the third segment,
      a fifth segment having the length C and being oriented perpendicular to the second segment, the fifth segment with a right end coupled to the lower end of the second segment, and
      a sixth segment having the length D and being oriented perpendicular to the fifth segment, the sixth segment with a feeder end coupled to a left half of the second dipole, and with a non-feeder end coupled to a left end of the fifth segment; and
   a second set of additional conductive strips disposed on the substrate and located within the right half of the polygon, the second set of additional conductive strips oriented as a mirror of the first set of additional conductive strips, wherein mirrors of the fourth and sixth segments are coupled to a right half of the first and second dipoles, respectively, and wherein a terminal end of a mirror of the first segment defines a second terminal of the two-terminal feed.

12. The radio frequency antenna of claim 11, wherein the conductive strips, the first set of additional conductive strips and the second set of additional conductive strips are formed integral with each other.

13. The radio frequency antenna of claim 11, wherein the polygon is a rectangle.

14. The radio frequency antenna of claim 13, wherein the conductive strips have a first width, wherein the additional conductive strips have other widths that are less than or equal to the first width, and wherein the radio frequency antenna has an impedance that is determined, at least in part, by a value of the first width and values of the other widths.

15. The radio frequency antenna of claim 14, wherein the radio frequency antenna has a central operating frequency and a corresponding free-space wavelength, and wherein the first and second dipoles are electrically half-wavelength dipoles at approximately the central operating frequency.

16. A radio frequency identification (RFID) tag comprising:
   a planar substrate;
   an integrated circuit, disposed on the planar substrate, the integrated circuit having an input terminal, the input terminal having an input impedance; and
   a RFID antenna, disposed on the planar substrate, the RFID antenna having a feed terminal coupled to the input terminal of the integrated circuit, wherein the feed terminal has a terminal impedance, and wherein the RFID antenna includes:
      electrical conductors disposed on the planar substrate, wherein the electrical conductors form first and second dipoles, and
      additional electrical conductors attached to the planar substrate, wherein the additional electrical conductors are one of parallel and perpendicular to the electrical conductors that form the first and second dipoles, wherein the additional electrical conductors form a first feeder portion and a second feeder portion, and wherein the first and second feeder portions are coupled to the antenna terminal,
      wherein the first feeder portion is also coupled to the first dipole at a first location and at a second location located a feeder length distance from the first location,
      wherein the second feeder portion is also coupled to the second dipole at a third location and at a fourth location located the feeder length distance from the third location,
      wherein each of two end portions of the first dipole distal from the first feeder portion is connected to a respective corresponding end portion of the second dipole distal from the second feeder portion, the first and second dipoles thereby forming a rectangle, and
wherein the terminal impedance is determined, at least in part, by the feeder length distance.

17. The RFID tag of claim 16, wherein the RFID antenna has a central operating frequency, wherein the terminal impedance is approximately a complex conjugate of the input impedance of the input terminal of the integrated circuit at the central operating frequency.

18. The RFID tag of claim 17, wherein the substrate comprises a high permeability or a high permittivity material, and wherein the tag is affixed to vehicular glass.

19. The RFID tag of claim 18, wherein the substrate, the antenna and the integrated circuit are surrounded by an insulating wrapper.

20. The RFID tag of claim 19, wherein the central operating frequency is 915 MHz, wherein the input terminal of the integrated circuit has an input impedance of approximately 33Ω+j170Ω, and wherein the feed terminal of the antenna has a radiation impedance of approximately 33Ω-j170Ω, at 915 MHz.

* * * * *